(12) United States Patent
Kurganov

(10) Patent No.: US 10,320,981 B2
(45) Date of Patent: Jun. 11, 2019

(54) PERSONAL VOICE-BASED INFORMATION RETRIEVAL SYSTEM

(71) Applicant: Parus Holdings, Inc., Bannockburn, IL (US)

(72) Inventor: Alexander Kurganov, Hudson, NH (US)

(73) Assignee: PARUS HOLDINGS, INC., Bannockburn, IL (US)

( * ) Notice: Subject to any disclaimer, the term of this patent is extended or adjusted under 35 U.S.C. 154(b) by 0 days.

(21) Appl. No.: 15/707,951

(22) Filed: Sep. 18, 2017

(65) Prior Publication Data
US 2018/0007201 A1 Jan. 4, 2018

Related U.S. Application Data

(63) Continuation of application No. 15/193,517, filed on Jun. 27, 2016, now Pat. No. 9,769,314, which is a
(Continued)

(51) Int. Cl.
*G06F 3/16* (2006.01)
*G06F 16/95* (2019.01)
(Continued)

(52) U.S. Cl.
CPC .......... *H04M 3/4938* (2013.01); *G06F 3/167* (2013.01); *G06F 16/638* (2019.01); *G06F 16/95* (2019.01);
(Continued)

(58) Field of Classification Search
CPC ........ G06F 3/167; G06F 16/95; G06F 16/638; G10L 17/24; G10L 15/06; G10L 15/26;
(Continued)

(56) References Cited

U.S. PATENT DOCUMENTS

| X174465 | 3/1876 | Bell |
|---|---|---|
| 3,728,486 A | 4/1973 | Kraus |

(Continued)

FOREIGN PATENT DOCUMENTS

| CA | 1329852 | 5/1994 |
|---|---|---|
| EP | 0572544 | 9/1996 |

(Continued)

OTHER PUBLICATIONS

Update Subject Matter Eligibility, Parus Holdings, inc; CBM2015-00112, Jul. 2015, pp. 1-33.
(Continued)

*Primary Examiner* — Lisa Hashem
(74) *Attorney, Agent, or Firm* — Patent Law Works LLP

(57) ABSTRACT

The present invention relates to a system for retrieving information from a network such as the Internet. A user creates a user-defined record in a database that identifies an information source, such as a web site, containing information of interest to the user. This record identifies the location of the information source and also contains a recognition grammar based upon a speech command assigned by the user. Upon receiving the speech command from the user that is described within the recognition grammar, a network interface system accesses the information source and retrieves the information requested by the user.

28 Claims, 5 Drawing Sheets

Related U.S. Application Data continuation of application No. 12/787,801, filed on May 26, 2010, now Pat. No. 9,377,992, which is a continuation of application No. 11/771,773, filed on Jun. 29, 2007, which is a continuation of application No. 09/777,406, filed on Feb. 6, 2001, now Pat. No. 7,516,190.

(60) Provisional application No. 60/180,343, filed on Feb. 4, 2000.

(51) Int. Cl.
| | |
|---|---|
| G10L 13/08 | (2013.01) |
| G10L 15/02 | (2006.01) |
| G10L 15/06 | (2013.01) |
| G10L 15/08 | (2006.01) |
| G10L 15/22 | (2006.01) |
| G10L 15/26 | (2006.01) |
| G10L 17/24 | (2013.01) |
| G10L 25/54 | (2013.01) |
| H04L 29/08 | (2006.01) |
| H04M 3/493 | (2006.01) |
| G06F 16/638 | (2019.01) |

(52) U.S. Cl.
CPC .............. *G10L 13/08* (2013.01); *G10L 15/02* (2013.01); *G10L 15/08* (2013.01); *G10L 15/22* (2013.01); *G10L 15/26* (2013.01); *G10L 25/54* (2013.01); *H04L 67/02* (2013.01); *G10L 15/06* (2013.01); *G10L 17/24* (2013.01); *G10L 2015/223* (2013.01); *H04L 29/0809* (2013.01); *H04M 2201/39* (2013.01); *H04M 2201/40* (2013.01); *H04M 2201/405* (2013.01); *H04M 2207/40* (2013.01)

(58) Field of Classification Search
CPC ......... G10L 15/08; G10L 25/54; G10L 15/24; G10L 13/08; G10L 15/02; G10L 15/22; G10L 2015/223; H04M 2207/40; H04M 2201/405; H04M 3/4938; H04M 2201/39; H04M 2201/40; H04L 29/0809; H04L 67/02

See application file for complete search history.

(56) References Cited

U.S. PATENT DOCUMENTS

| | | | |
|---|---|---|---|
| 4,058,838 A | 11/1977 | Crager et al. |
| 4,100,377 A | 7/1978 | Flanagan |
| 4,131,024 A | 12/1978 | Mezrich et al. |
| 4,158,750 A | 6/1979 | Sakoe et al. |
| 4,313,035 A | 1/1982 | Jordan et al. |
| 4,327,251 A | 4/1982 | Fomenko et al. |
| 4,340,783 A | 7/1982 | Sugiyama et al. |
| 4,340,797 A | 7/1982 | Takano et al. |
| 4,340,800 A | 7/1982 | Ueda et al. |
| 4,371,752 A | 2/1983 | Matthews et al. |
| 4,481,574 A | 11/1984 | DeFino et al. |
| 4,489,438 A | 12/1984 | Hughes |
| 4,500,751 A | 2/1985 | Darland et al. |
| 4,513,390 A | 4/1985 | Walter et al. |
| 4,523,055 A | 6/1985 | Hohl et al. |
| 4,549,047 A | 10/1985 | Brian et al. |
| 4,584,434 A | 4/1986 | Hashimoto |
| 4,585,906 A | 4/1986 | Matthews et al. |
| 4,596,900 A | 6/1986 | Jackson |
| 4,602,129 A | 7/1986 | Matthews et al. |
| 4,635,253 A | 1/1987 | Urui et al. |
| 4,652,700 A | 3/1987 | Matthews et al. |
| 4,696,028 A | 9/1987 | Morganstein et al. |
| 4,713,837 A | 12/1987 | Gordon |
| 4,747,127 A | 5/1988 | Hansen et al. |
| 4,748,656 A | 5/1988 | Gibbs et al. |
| 4,755,932 A | 7/1988 | Diedrich |
| 4,757,525 A | 7/1988 | Matthews et al. |
| 4,761,807 A | 8/1988 | Matthews et al. |
| 4,763,317 A | 8/1988 | Lehman et al. |
| 4,769,719 A | 9/1988 | Endo |
| 4,771,425 A | 9/1988 | Baran et al. |
| 4,776,016 A | 10/1988 | Hansen |
| 4,782,517 A | 11/1988 | Bernardis et al. |
| 4,792,968 A | 12/1988 | Katz |
| 4,799,144 A | 1/1989 | Parruck et al. |
| 4,809,321 A | 2/1989 | Morganstein et al. |
| 4,811,381 A | 3/1989 | Woo et al. |
| 4,837,798 A | 6/1989 | Cohen et al. |
| 4,847,891 A | 7/1989 | Kotani |
| 4,850,012 A | 7/1989 | Mehta et al. |
| 4,852,149 A | 7/1989 | Zwick et al. |
| 4,852,170 A | 7/1989 | Bordeaux |
| 4,866,758 A | 9/1989 | Heinzelmann |
| 4,873,719 A | 10/1989 | Reese |
| 4,879,743 A | 11/1989 | Burke et al. |
| 4,893,333 A | 1/1990 | Baran et al. |
| 4,893,335 A | 1/1990 | Fuller et al. |
| 4,903,289 A | 2/1990 | Hashimoto |
| 4,903,291 A | 2/1990 | Tsurufuji et al. |
| 4,905,273 A | 2/1990 | Gordon et al. |
| 4,907,079 A | 3/1990 | Turner et al. |
| 4,918,722 A | 4/1990 | Duehren et al. |
| 4,922,518 A | 5/1990 | Gordon et al. |
| 4,922,520 A | 5/1990 | Bernard et al. |
| 4,922,526 A | 5/1990 | Morganstein et al. |
| 4,926,462 A | 5/1990 | Ladd et al. |
| 4,930,150 A | 5/1990 | Katz |
| 4,933,966 A | 6/1990 | Hird et al. |
| 4,935,955 A | 6/1990 | Neudorfer |
| 4,935,958 A | 6/1990 | Morganstein et al. |
| 4,941,170 A | 7/1990 | Herbst |
| 4,942,598 A | 7/1990 | Davis |
| 4,953,204 A | 8/1990 | Cuschleg, Jr. et al. |
| 4,955,047 A | 9/1990 | Morganstein et al. |
| 4,956,835 A | 9/1990 | Grover |
| 4,959,854 A | 9/1990 | Cave et al. |
| 4,967,288 A | 10/1990 | Mizutori et al. |
| 4,969,184 A | 11/1990 | Gordon et al. |
| 4,972,462 A | 11/1990 | Shibata |
| 4,974,254 A | 11/1990 | Perine et al. |
| 4,975,941 A | 12/1990 | Morganstein et al. |
| 4,985,913 A | 1/1991 | Shalom et al. |
| 4,994,926 A | 2/1991 | Gordon et al. |
| 4,996,704 A | 2/1991 | Brunson |
| 5,003,575 A | 3/1991 | Chamberlin et al. |
| 5,003,577 A | 3/1991 | Ertz et al. |
| 5,008,926 A | 4/1991 | Misholi |
| 5,020,095 A | 5/1991 | Morganstein et al. |
| 5,027,384 A | 6/1991 | Morganstein |
| 5,029,196 A | 7/1991 | Morganstein |
| 5,036,533 A | 7/1991 | Carter et al. |
| 5,054,054 A | 10/1991 | Pessia et al. |
| 5,065,254 A | 11/1991 | Hishida |
| 5,086,835 A | 2/1992 | Launey et al. |
| 5,095,445 A | 3/1992 | Sekiguchi |
| 5,099,509 A | 3/1992 | Morganstein et al. |
| 5,109,405 A | 4/1992 | Morganstein |
| 5,128,984 A | 7/1992 | Katz |
| 5,133,004 A | 7/1992 | Heileman, Jr. et al. |
| 5,146,452 A | 9/1992 | Pekarske |
| 5,166,974 A | 11/1992 | Morganstein et al. |
| 5,179,585 A | 1/1993 | MacMillan, Jr. et al. |
| 5,193,110 A | 3/1993 | Jones et al. |
| 5,195,086 A | 3/1993 | Baumgartner et al. |
| 5,233,600 A | 8/1993 | Pekarske |
| 5,243,643 A | 9/1993 | Sattar et al. |
| 5,243,645 A | 9/1993 | Bissell et al. |
| 5,249,219 A | 9/1993 | Morganstein et al. |
| 5,255,305 A | 10/1993 | Sattar |
| 5,263,084 A | 11/1993 | Chaput et al. |
| 5,276,729 A | 1/1994 | Higuchi et al. |
| 5,287,199 A | 2/1994 | Zoccolillo |

(56) References Cited

U.S. PATENT DOCUMENTS

| | | |
|---|---|---|
| 5,291,302 A | 3/1994 | Gordon et al. |
| 5,291,479 A | 3/1994 | Vaziri et al. |
| 5,303,298 A | 4/1994 | Morganstein et al. |
| 5,307,399 A | 4/1994 | Dai et al. |
| 5,309,504 A | 5/1994 | Morganstein |
| 5,325,421 A | 6/1994 | Hou et al. |
| 5,327,486 A | 7/1994 | Wolff et al. |
| 5,327,529 A | 7/1994 | Fults et al. |
| 5,329,578 A | 7/1994 | Brennan et al. |
| 5,333,266 A | 7/1994 | Boaz et al. |
| 5,347,574 A | 9/1994 | Morganstein |
| 5,355,403 A | 10/1994 | Richardson, Jr. et al. |
| 5,359,598 A | 10/1994 | Steagall et al. |
| 5,365,524 A | 11/1994 | Hiller et al. |
| 5,365,574 A | 11/1994 | Hunt et al. |
| 5,375,161 A | 12/1994 | Fuller et al. |
| 5,384,771 A | 1/1995 | Isidoro et al. |
| 5,404,231 A | 4/1995 | Bloomfield |
| 5,408,526 A | 4/1995 | McFarland et al. |
| 5,414,754 A | 5/1995 | Pugh et al. |
| 5,416,834 A | 5/1995 | Bales et al. |
| 5,426,421 A | 6/1995 | Gray |
| 5,432,845 A | 7/1995 | Burd et al. |
| 5,436,963 A | 7/1995 | Fitzpatrick et al. |
| 5,459,584 A | 10/1995 | Gordon et al. |
| 5,463,684 A | 10/1995 | Morduch et al. |
| 5,475,791 A | 12/1995 | Schalk et al. |
| 5,479,487 A | 12/1995 | Hammond |
| 5,495,484 A | 2/1996 | Self et al. |
| 5,497,373 A | 3/1996 | Hulen et al. |
| 5,499,288 A | 3/1996 | Hunt et al. |
| 5,515,427 A | 5/1996 | Carlsen et al. |
| 5,517,558 A | 5/1996 | Schalk |
| 5,526,353 A | 6/1996 | Henley et al. |
| 5,533,115 A | 7/1996 | Hollenbach et al. |
| 5,537,461 A | 7/1996 | Bridges et al. |
| 5,555,100 A | 9/1996 | Bloomfield et al. |
| 5,559,611 A | 9/1996 | Bloomfield et al. |
| 5,559,859 A | 9/1996 | Dai et al. |
| 5,566,236 A | 10/1996 | MeLampy et al. |
| 5,603,031 A | 2/1997 | White et al. |
| 5,608,786 A | 3/1997 | Gordon |
| 5,610,910 A | 3/1997 | Focsaneanu et al. |
| 5,610,970 A | 3/1997 | Fuller et al. |
| 5,611,031 A | 3/1997 | Hertzfeld et al. |
| 5,630,079 A | 5/1997 | McLaughlin |
| 5,652,789 A | 7/1997 | Miner et al. |
| 5,657,376 A | 8/1997 | Espeut et al. |
| 5,659,597 A | 8/1997 | Bareis et al. |
| 5,666,401 A | 9/1997 | Morganstein et al. |
| 5,675,507 A | 10/1997 | Bobo, II |
| 5,675,811 A | 10/1997 | Broedner et al. |
| 5,689,669 A | 11/1997 | Lynch et al. |
| 5,692,187 A | 11/1997 | Goldman et al. |
| 5,699,486 A | 12/1997 | Tullis et al. |
| 5,712,903 A | 1/1998 | Bartholomew et al. |
| 5,719,921 A | 2/1998 | Vysotsky et al. |
| 5,721,908 A | 2/1998 | Lagarde et al. |
| 5,724,408 A | 3/1998 | Morganstein |
| 5,737,395 A | 4/1998 | Irribarren |
| 5,742,596 A | 4/1998 | Baratz et al. |
| 5,742,905 A | 4/1998 | Pepe et al. |
| 5,752,191 A | 5/1998 | Fuller et al. |
| 5,758,322 A | 5/1998 | Rongley |
| 5,761,294 A | 6/1998 | Shaffer et al. |
| 5,764,639 A | 6/1998 | Staples et al. |
| 5,764,736 A | 6/1998 | Shachar et al. |
| 5,764,910 A | 6/1998 | Shachar |
| 5,774,860 A | 6/1998 | Bayya et al. |
| 5,787,298 A | 7/1998 | Broedner et al. |
| 5,793,993 A | 8/1998 | Broedner et al. |
| 5,794,205 A | 8/1998 | Walters et al. |
| 5,796,791 A | 8/1998 | Polcyn |
| 5,799,063 A | 8/1998 | Krane |
| 5,799,065 A | 8/1998 | Junqua et al. |
| 5,809,282 A | 9/1998 | Cooper et al. |
| 5,809,481 A | 9/1998 | Baron et al. |
| 5,812,796 A | 9/1998 | Broedner et al. |
| 5,819,220 A | 10/1998 | Sarukkai et al. |
| 5,819,306 A | 10/1998 | Goldman et al. |
| 5,822,727 A | 10/1998 | Garberg et al. |
| 5,823,879 A | 10/1998 | Goldberg et al. |
| 5,832,063 A | 11/1998 | Vysotsky et al. |
| 5,832,440 A | 11/1998 | Woodbridge et al. |
| 5,835,570 A | 11/1998 | Wattenbarger |
| 5,838,682 A | 11/1998 | Dekelbaum et al. |
| 5,867,494 A | 2/1999 | Krishnaswamy et al. |
| 5,867,495 A | 2/1999 | Elliott et al. |
| 5,870,550 A | 2/1999 | Wesinger, Jr. et al. |
| 5,873,080 A | 2/1999 | Coden et al. |
| 5,881,134 A | 3/1999 | Foster et al. |
| 5,881,135 A | 3/1999 | Watts et al. |
| 5,884,032 A | 3/1999 | Bateman et al. |
| 5,884,262 A | 3/1999 | Wise et al. |
| 5,884,266 A | 3/1999 | Dvorak |
| 5,890,123 A | 3/1999 | Brown et al. |
| 5,905,476 A | 5/1999 | McLaughlin et al. |
| 5,914,951 A | 6/1999 | Bentley et al. |
| 5,915,001 A | 6/1999 | Uppaluru |
| 5,917,817 A | 6/1999 | Dunn et al. |
| 5,926,789 A | 7/1999 | Barbara et al. |
| 5,940,598 A | 8/1999 | Strauss et al. |
| 5,943,399 A | 8/1999 | Bannister et al. |
| 5,946,389 A | 8/1999 | Dold |
| 5,953,392 A | 9/1999 | Rhie et al. |
| 5,974,124 A | 10/1999 | Schlueter, Jr. et al. |
| 5,974,413 A | 10/1999 | Beauregard et al. |
| 5,991,292 A | 11/1999 | Focsaneanu et al. |
| 5,995,615 A | 11/1999 | Miloslavsky |
| 5,999,525 A | 12/1999 | Krishnaswamy et al. |
| 5,999,611 A | 12/1999 | Tatchell et al. |
| 5,999,965 A | 12/1999 | Kelly |
| 6,012,088 A | 1/2000 | Li et al. |
| 6,014,437 A | 1/2000 | Acker et al. |
| 6,014,626 A | 1/2000 | Cohen |
| 6,018,710 A | 1/2000 | Wynblatt et al. |
| 6,021,181 A | 2/2000 | Miner et al. |
| 6,021,190 A | 2/2000 | Fuller et al. |
| 6,031,904 A | 2/2000 | An et al. |
| 6,038,305 A | 3/2000 | McAllister et al. |
| 6,044,107 A | 3/2000 | Gatherer et al. |
| 6,047,053 A | 4/2000 | Miner et al. |
| 6,052,372 A | 4/2000 | Gittins et al. |
| 6,067,516 A | 5/2000 | Levay et al. |
| 6,078,580 A | 6/2000 | Mandalia et al. |
| 6,081,518 A | 6/2000 | Bowman-Amuah |
| 6,081,782 A | 6/2000 | Rabin |
| 6,091,808 A | 7/2000 | Wood et al. |
| 6,101,472 A | 8/2000 | Giangarra et al. |
| 6,104,803 A | 8/2000 | Weser et al. |
| 6,115,737 A | 9/2000 | Ely et al. |
| 6,115,742 A | 9/2000 | Franklin et al. |
| 6,130,933 A | 10/2000 | Miloslavsky |
| 6,131,095 A | 10/2000 | Low et al. |
| 6,137,863 A | 10/2000 | Brown et al. |
| 6,144,991 A | 11/2000 | England |
| 6,157,705 A | 12/2000 | Perrone |
| 6,161,128 A | 12/2000 | Smyk |
| 6,178,399 B1 | 1/2001 | Takebayashi et al. |
| 6,185,535 B1 | 2/2001 | Hedin et al. |
| 6,188,683 B1 | 2/2001 | Lang et al. |
| 6,195,357 B1 | 2/2001 | Polcyn |
| 6,199,076 B1 | 3/2001 | Logan et al. |
| 6,201,814 B1 | 3/2001 | Greenspan |
| 6,201,863 B1 | 3/2001 | Miloslavsky |
| 6,208,638 B1 | 3/2001 | Rieley et al. |
| 6,215,858 B1 | 4/2001 | Bartholomew et al. |
| 6,230,132 B1 | 5/2001 | Class et al. |
| 6,233,318 B1 | 5/2001 | Picard et al. |
| 6,243,373 B1 | 6/2001 | Turock |
| 6,252,944 B1 | 6/2001 | Hansen, II et al. |
| 6,269,336 B1 | 7/2001 | Ladd et al. |
| 6,285,745 B1 | 9/2001 | Bartholomew et al. |
| 6,327,572 B1 | 12/2001 | Morton et al. |

(56) References Cited

U.S. PATENT DOCUMENTS

| | | |
|---|---|---|
| 6,330,538 B1 | 12/2001 | Breen |
| 6,343,529 B1 | 2/2002 | Pool |
| 6,349,132 B1 | 2/2002 | Wesemann et al. |
| 6,353,661 B1 | 3/2002 | Bailey, III |
| 6,366,575 B1 | 4/2002 | Barkan et al. |
| 6,366,578 B1 | 4/2002 | Johnson |
| 6,424,945 B1 | 7/2002 | Sorsa |
| 6,430,282 B1 | 8/2002 | Bannister et al. |
| 6,434,529 B1 | 8/2002 | Walker et al. |
| 6,445,694 B1 | 9/2002 | Swartz |
| 6,446,076 B1 | 9/2002 | Burkey et al. |
| 6,456,699 B1 | 9/2002 | Burg et al. |
| 6,459,910 B1 | 10/2002 | Houston |
| 6,477,240 B1 | 11/2002 | Lim et al. |
| 6,477,420 B1 | 11/2002 | Struble et al. |
| 6,490,627 B1 | 12/2002 | Kalra et al. |
| 6,501,966 B1 | 12/2002 | Bareis et al. |
| 6,505,163 B1 | 1/2003 | Zhang et al. |
| 6,529,948 B1 | 3/2003 | Bowman-Amuah |
| 6,532,444 B1 | 3/2003 | Weber |
| 6,539,359 B1 | 3/2003 | Ladd et al. |
| 6,546,393 B1 | 4/2003 | Khan |
| 6,560,604 B1 | 5/2003 | Fascenda |
| 6,584,439 B1 | 6/2003 | Geilhufe et al. |
| 6,587,822 B2 | 7/2003 | Brown et al. |
| 6,593,944 B1 | 7/2003 | Nicolas et al. |
| 6,594,348 B1 | 7/2003 | Bjurstrom et al. |
| 6,594,692 B1 | 7/2003 | Reisman |
| 6,604,075 B1 | 8/2003 | Brown et al. |
| 6,606,611 B1 | 8/2003 | Khan |
| 6,618,039 B1 | 9/2003 | Grant et al. |
| 6,618,726 B1 | 9/2003 | Colbath et al. |
| 6,618,763 B1 | 9/2003 | Steinberg |
| 6,636,831 B1 | 10/2003 | Profit, Jr. et al. |
| 6,654,814 B1 | 11/2003 | Britton et al. |
| 6,658,662 B1 | 12/2003 | Nielsen |
| 6,665,640 B1 | 12/2003 | Bennett et al. |
| 6,687,341 B1 | 2/2004 | Koch et al. |
| 6,704,024 B2 | 3/2004 | Robotham et al. |
| 6,718,015 B1 | 4/2004 | Berstis |
| 6,721,705 B2 | 4/2004 | Kurganov et al. |
| 6,724,868 B2 | 4/2004 | Pradhan et al. |
| 6,732,142 B1 | 5/2004 | Bates et al. |
| 6,763,388 B1 | 7/2004 | Tsimelzon |
| 6,771,732 B2 | 8/2004 | Xiao et al. |
| 6,771,743 B1 | 8/2004 | Butler et al. |
| 6,775,264 B1 | 8/2004 | Kurganov |
| 6,785,266 B2 | 8/2004 | Swartz |
| 6,807,257 B1 | 10/2004 | Kurganov |
| 6,812,939 B1 | 11/2004 | Flores et al. |
| 6,823,370 B1 | 11/2004 | Kredo et al. |
| 6,888,929 B1 | 5/2005 | Saylor et al. |
| 6,922,733 B1 | 7/2005 | Kuiken et al. |
| 6,941,273 B1 | 9/2005 | Loghmani et al. |
| 6,964,012 B1 | 11/2005 | Zirngibl et al. |
| 6,964,023 B2 | 11/2005 | Maes et al. |
| 6,965,864 B1 | 11/2005 | Thrift et al. |
| 6,996,609 B2 | 2/2006 | Hickman et al. |
| 6,999,804 B2 | 2/2006 | Engstrom et al. |
| 7,003,463 B1 | 2/2006 | Maes et al. |
| 7,024,464 B1 | 4/2006 | Lusher et al. |
| 7,050,977 B1 | 5/2006 | Bennett |
| 7,075,555 B1 | 7/2006 | Flores et al. |
| 7,076,431 B2 | 7/2006 | Kurganov et al. |
| 7,089,307 B2 | 8/2006 | Zintel et al. |
| 7,145,898 B1 | 12/2006 | Elliott |
| 7,146,323 B2 | 12/2006 | Guenther et al. |
| 7,327,723 B2 | 2/2008 | Kurganov |
| 7,386,455 B2 | 6/2008 | Kurganov et al. |
| 7,506,022 B2 | 3/2009 | Wang et al. |
| 7,516,190 B2 | 4/2009 | Kurganov |
| 7,729,913 B1* | 6/2010 | Lee .................. G06F 17/30654 |
| | | 704/251 |
| 7,881,941 B2 | 2/2011 | Kurganov et al. |
| 7,974,875 B1 | 7/2011 | Quilici et al. |
| 8,098,600 B2 | 1/2012 | Kurganov |
| 8,131,267 B2 | 3/2012 | Lichorowic et al. |
| 8,131,555 B1 | 3/2012 | Carriere et al. |
| 8,185,402 B2 | 5/2012 | Kurganov et al. |
| 8,380,505 B2 | 2/2013 | Konig et al. |
| 8,775,176 B2 | 7/2014 | Gilbert et al. |
| 8,838,074 B2 | 9/2014 | Kurganov |
| 8,843,120 B2 | 9/2014 | Kurganov |
| 8,843,141 B2 | 9/2014 | Kurganov |
| 8,874,446 B2 | 10/2014 | Carriere et al. |
| 9,451,084 B2 | 9/2016 | Kurganov et al. |
| 9,690,854 B2 | 6/2017 | Stent et al. |
| 2001/0011302 A1 | 8/2001 | Son |
| 2001/0032234 A1 | 10/2001 | Summers et al. |
| 2001/0040885 A1 | 11/2001 | Jonas et al. |
| 2001/0048676 A1 | 12/2001 | Jimenez et al. |
| 2002/0006126 A1 | 1/2002 | Johnson et al. |
| 2002/0059402 A1 | 5/2002 | Belanger |
| 2002/0064149 A1 | 5/2002 | Elliott et al. |
| 2002/0087327 A1 | 7/2002 | Lee et al. |
| 2002/0090114 A1 | 7/2002 | Rhoads et al. |
| 2002/0104025 A1 | 8/2002 | Wrench, Jr. |
| 2002/0142786 A1 | 10/2002 | Pradhan et al. |
| 2003/0002635 A1 | 1/2003 | Koch et al. |
| 2004/0160913 A1 | 8/2004 | Kubler et al. |
| 2004/0247094 A1 | 12/2004 | Crockett et al. |
| 2005/0025133 A1 | 2/2005 | Swartz |
| 2005/0030179 A1 | 2/2005 | Script et al. |
| 2005/0074104 A1 | 4/2005 | Swartz |
| 2005/0102147 A1 | 5/2005 | Ulrich et al. |
| 2005/0278179 A1 | 12/2005 | Overend et al. |
| 2006/0069926 A1 | 3/2006 | Ginter et al. |
| 2007/0061149 A1* | 3/2007 | Chang .................. H04N 21/2543 |
| | | 704/275 |
| 2007/0136072 A1 | 6/2007 | Sampath |
| 2007/0206737 A1 | 9/2007 | Hickman |
| 2007/0249406 A1 | 10/2007 | Andreasson |
| 2007/0263601 A1 | 11/2007 | Kurganov |
| 2007/0286360 A1 | 12/2007 | Chu et al. |
| 2008/0103780 A1* | 5/2008 | Dacosta ............ G06F 17/30787 |
| | | 704/275 |
| 2008/0228494 A1 | 9/2008 | Cross |
| 2009/0276441 A1* | 11/2009 | Malik .................. G06F 16/245 |
| 2009/0286514 A1 | 11/2009 | Lichoriwic et al. |
| 2010/0042413 A1 | 2/2010 | Simpson et al. |
| 2010/0094635 A1 | 4/2010 | Bermudez Perez |
| 2011/0035220 A1 | 2/2011 | Opaluch |
| 2011/0054898 A1 | 3/2011 | Phillips et al. |
| 2011/0082696 A1 | 4/2011 | Johnston et al. |
| 2011/0091023 A1 | 4/2011 | Kurganov et al. |
| 2011/0093271 A1* | 4/2011 | Bernard ............... G06F 17/2785 |
| | | 704/257 |
| 2011/0153324 A1 | 6/2011 | Ballinger et al. |
| 2012/0179464 A1 | 7/2012 | Newman et al. |
| 2012/0253800 A1 | 10/2012 | Goller et al. |
| 2013/0006638 A1 | 1/2013 | Lindahl |
| 2013/0041666 A1 | 2/2013 | Bak |
| 2013/0054238 A1* | 2/2013 | Bodell .................... G10L 15/22 |
| | | 704/235 |
| 2013/0191122 A1 | 7/2013 | Mason |
| 2013/0275164 A1* | 10/2013 | Gruber .................... G10L 17/22 |
| | | 705/5 |
| 2013/0317823 A1 | 11/2013 | Mengibar |
| 2014/0032652 A1* | 1/2014 | Hu .......................... H04L 67/42 |
| | | 709/203 |
| 2014/0039898 A1 | 2/2014 | Reich et al. |
| 2014/0046660 A1 | 2/2014 | Kamdar |
| 2014/0111415 A1 | 4/2014 | Gargi et al. |
| 2014/0122073 A1* | 5/2014 | Goldstein ............... H04M 1/05 |
| | | 704/235 |
| 2014/0123010 A1 | 5/2014 | Goldstein |
| 2015/0134340 A1 | 5/2015 | Blaisch |
| 2015/0185985 A1 | 7/2015 | Kang et al. |
| 2015/0234636 A1 | 8/2015 | Barnes, Jr. |
| 2015/0277846 A1 | 10/2015 | Yen et al. |
| 2015/0334080 A1 | 11/2015 | Tamayo |
| 2015/0339745 A1 | 11/2015 | Peter et al. |
| 2016/0057383 A1 | 2/2016 | Pattan et al. |
| 2016/0080811 A1 | 3/2016 | Fukushima et al. |

(56) References Cited

U.S. PATENT DOCUMENTS

| | | | |
|---|---|---|---|
| 2016/0125881 | A1 | 5/2016 | Vogel et al. |
| 2016/0179752 | A1 | 6/2016 | Clark et al. |
| 2016/0225369 | A1 | 8/2016 | Agrawal et al. |
| 2016/0239497 | A1 | 8/2016 | O'Donnell |
| 2016/0321266 | A1 | 11/2016 | Philippov et al. |
| 2016/0328206 | A1 | 11/2016 | Nakaoka et al. |
| 2017/0116986 | A1 | 4/2017 | Weng et al. |
| 2017/0178626 | A1 | 6/2017 | Gruber et al. |
| 2017/0293600 | A1 | 10/2017 | Stent et al. |
| 2017/0359334 | A1 | 12/2017 | Maddox et al. |
| 2018/0130464 | A1 | 5/2018 | Haviv et al. |
| 2018/0204563 | A1* | 7/2018 | Liang .................. G06F 3/16 |

FOREIGN PATENT DOCUMENTS

| | | |
|---|---|---|
| EP | 0794650 | 9/1997 |
| GB | 2211698 | 7/1989 |
| GB | 2240693 | 8/1991 |
| GB | 2317782 | 4/1998 |
| JP | 1-258526 | 10/1989 |
| WO | 91/07838 | 5/1991 |
| WO | 91/18466 | 11/1991 |
| WO | 96/09710 | 3/1996 |
| WO | 97/34401 | 9/1997 |
| WO | 97/37481 | 10/1997 |
| WO | 98/23058 | 5/1998 |

OTHER PUBLICATIONS

Wikipedia Definition of "Internet", retrieved from http://en.wikipedia.org/wiki/Internet on Feb. 10, 2016, 13 pgs.
Yang, "INETPhone—Telephone Services and Servers on the Internet," Apr. 1995, University of North Texas, pp. 1-6.
"Faxpak Store and Forward Facsimile Transmission Service," Electrical Communication, vol. 54(3), 1979, pp. 251-255.
"Introducing PIC SuperFax, First PC/Fax System to Run Under Windows," Pacific Image Communications, Pasadena, CA, Date Unknown (received at COMDEX show, Nov. 3, 1987), 4 pgs.
"PureSpeech Announces Juggler PC System for First Quarter of 1997," HighBeam Research, Sep. 19, 1996, pp. 1-3, available at http://www.highbeam.com/doc/1G1-186909545.html (accessed on Dec. 8, 2006).
"The VMX Systems Product Reference Manual: Product Description Volume," May 1994, vol. 1, release 7.1, VMS, Inc. (Octel Communications Corp.), San Jose, CA, USA, 577 pgs.
"VMXworks Product Reference Manual: vol. 3 Programmer's Guide," Jul. 1994, vols. 3 & 4, Release 3.1, Octel Communications Corp., Milpitas, CA, USA, 488 pgs.
Amended Complaint, *Parus Holdings, Inc. v. Web Telephony LLC & Robert Swartz*, Case No. 06-cv-01146 (N.D. III.), Jul. 10, 2006, 14 pgs.
Defendant's Answer to the Amended Complaint and Demand for Jury Trial, *Parus Holdings, Inc. v. Web Telephone LLC & Robert Swartz*, Case No. 06-cv-00146 (N.D. III.), Aug. 10, 2006, 14 pgs.
McGraw-Hill Dictionary of Scientific & Technical Terms 1101, 6th ed. 2003, (referenced in Amendment and Reply Under 37 CFR 1.111 filed for U.S. Appl. No. 10/877,366, filed Apr. 24, 2009).
Oye, "Juggler," p. 1, available at http://www.philoye.com/work/juggler/index.shtml (accessed on Dec. 8, 2006).
Oye, "Juggler," p. 1, available at http://www.philoye.com/work/juggler_2.shtml (accessed on Dec. 8, 2006).
Oye, "Juggler," p. 1, available at http://www.philoye.com/work/juggler_3.shtml (accessed on Dec. 8, 2006).
Plaintiff Parus Holdings, Inc.'s Supplemental Responses to Defendant Web Telephone LLC's First Set of Interrogatories (Nos. 1-12), *Parus Holdings, Inc. v. Web Telephony LLC & Robert Swartz*, Case No. 06-cv-01146 (n.D. III.), Oct. 31, 2006, 32 pgs.
Plaintiff Parus Holdings, Inc.'s Supplemental Responses to Defendant Web Telephone LLC's Second Set of Interrogatories (Nos. 13-17), *Parus Holdings, Inc. v. Web Telephony LLC & Robert Swartz*, Case No. 06-cv-01146 (n.D. III.), Oct. 31, 2006, 31 pgs.
Purespeech, "Meet the Voice of Juggler!" Nov. 18, 1996, pp. 1-3.
Ross, "Retrieve E-mail from a Telephone," Oct. 7, 1996, pp. 1-2, available at http://resna.org/ProfessOrg?Sigs?SIGSites/sig11/archive/juggler.htm (accessed on Dec. 8, 2006).
"A PABX that Listens and Talks," Speech Technology, Jan./Feb. 1984, pp. 74-79.
"Business Phone Systems for Advanced Offices," NTT Review, vol. 2 (6), Nov. 1990, pp. 52-54.
"Data Communications Networks: Message Handling Systems," Fascicle, VII1.7, Recommendations X.400-X.430, Oct. 3-19, 1984, 42 pgs.
"Globecom '85 IEEE Global Telecommunications Conference," New Orleans, LA, Dec. 2-5, 1985, pp. 1295-1300.
"Juggler by PureSpeech," available at http://members.aol.com/compqanda1/juggler.html (accessed on Dec. 8, 2006), p. 1.
"Proceedings of the IFIP 10th World Computer Congress," Dublin, Ireland, Sep. 1-5, 1986, 16 pgs.
"PureSpeech's Juggler," Teleconnect, Dec. 1996, p. 36.
"Secretarial Branch Exchange," IBM Technical Disclosure Bulletin, vol. 26(5), Oct. 1983, pp. 2645-2647.
"Wildfire Communication, Inc.," Harvard Business School, Mar. 21, 1996, Publ. No. 9-396-305, pp. 1-22.
"WordPerfect: New Telephony Features Boost Office," WordPerfect Office TechBrief, 1994, Info-World Publishing, Co., vol. 10, Issue 2, pp. 2-3.
AT&T Press Release, "AT&T Customers Can Teach Systems to Listen and Respond to Voice," Jan. 17, 1995, pp. 1-2, Basking Ridge, NJ, retrieved from www.lucent.com/press/0195/950117.gbb.html on Mar. 15, 2005.
Bellcore Technology Licensing, "The Electronic Receptionist—A Knowledge-Based Approach to Personal Communications," 1994, pp. 1-8.
Brachman et al., "Fragmentation in Store-and-Forward Message Transfer," IEEE Communications Magazine, vol. 26(7), Jul. 1998, pp. 18-27.
Brief of Appellees, submitted on Jun. 20, 2016, to the United States Court of Appeals for the Federal Circuit, 53 pgs.
Cole et al., "An Architecture for a Mobile OSI Mail Access System," IEEE Journal on Selected Areas in communications, vol. 7(2), Feb. 1989, pp. 249-256.
DAX Systems, Inc., Press Release, "Speech Recognition Sucecss in DAX's Grasp," Nov. 22, 1995, pp. 1-2, Pine Brook, NJ.
Examples: Abstract Ideas, 2014, CBM2015-00112 Exhibit 2004, 20 pgs.
Garcia et al., "Issues in Multimedia Computer-Based Message Systems Design and Standardization," NATO ASI Series, vol. 1-6, 1984, 18 pgs.
Hemphill et al., "Speech-Aware Multimedia," IEEE MultiMedia, Spring 1996, vol. 3, No. 1, pp. 74-78.
Hemphill et al., ""Surfing the Web by Voice,"" ACM Multimedia 95—Electronic Proceedings, Nov. 5-9, 1995, San Francisco, CA, 8 pgs.
Hunt et al., "Long Distance Remote Control to the Rescue," Chicago Tribune, Jun. 15, 2002, Section 4, p. 15.
IBM AIX DirectTalk/6000 Version 1 Release 6 Improves Your Voice Processing Services to Callers and Customers, Announcement No. 295-489, Nov. 28, 1995, 27 pages.
IBM Announcement Letter No. A95-893, retrieved on Mar. 9, 2015, 10 pgs.
IBM, AIX DirectTalk/6000 Release 6: Speech Recognition with the BBN Hark Recognizer, SC33-1734-00, Feb. 1996, 250 pgs.
IBM, AIX DirectTalk/6000: General Information and Planning, Release 6, GC33-1720-00, Dec. 1995, 162 pgs.
IBM, DirectTalkMail: Administration, Release 6, SC33-1733-00, Feb. 1996, 274 pgs.
Joint Appendix, submitted on Sep. 16, 2016, to the United States Court of Appeal for the Federal Circuit, 406 pgs.
Judgment without Opinion for *Parus Holdings Inc., v. Sallie Mae Bank, Navient Solutions Inc.*, PNC Bank, N.A., Suntrust Bank, Suntrust Mortgage Inc., 2016-1179, 2016-1180, 2016-1181, entered Feb. 27, 2017, 2 pgs.

(56) References Cited

OTHER PUBLICATIONS

Kubala et al., "BYBLOS Speech Recognition Benchmark Results," Workshop on Speech & Natural Language, Feb. 19-22, 1991. pp. 77-82.

Ly, "Chatter A: A Conversational Telephone Agent," submitted to Program in Media Arts and Sciences, Massachusetts Institute of Technology, 1993, pp. 1-130.

Maeda et al., "An Intelligent Customer-Controlled Switching System," IEEE Global Telecommunications Conference, Hollywood, Florida, Nov. 28-Dec. 1, 1988, pp. 1499-1503.

Markowitz, "The Ultimate Computer Input Device May Be Right Under Your Nose," Byte, Dec. 1995, pp. 1-13, available at www.byte.com/art/9512/sec8/art1.htm (accessed Mar. 15, 2005).

Marx et al., "Mail Call: Message Presentation and Navigation in a Nonvisual Environment," SIGCHI Conference on Human Factos in Computing Systems, Vacouver, B.C., Canada, Apr. 13-18, 1996, 8 pgs.

Marx, "Toward Effective Conversational Messaging" thesis presented to the Departmental Committee on Graduate Students, Program in Media Arts and Sciences, School of Architecture and Planning, Massachusetts Institute of Technology, May 12, 1995, 123 pgs.

Memorandum Opinion and Order, U.S. District Court for the District of Delaware, Civil No. 14-1427-SLR, Oct. 8, 2015, 27 pgs.

Newton, Harry, Newtons Telecom Dictionary—The Official Glossary of Telecommunications and Voice Processing Terms, Dec. 1992, 6 pages.

Opening Brief of Appellant Parus Holdings, Inc., submitted on Mar. 8, 2016, to the United States Court of Appeal for the Federal Circuit, Appeal Nos. 2016-1179, -1180, and -1181, 236 pgs.

Paper No. 10, Denying Institution of Covered Business Method Patent Review CBM2015-00109 and CBM2015-00149, Nov. 9, 2015, 19 pgs.

Paper No. 10, Denying Institution of Covered Business Method Patent Review CBM2015-00110 and CBM2015-00150, Nov. 9, 2015, 20 pgs.

Paper No. 10, Denying Institution of Covered Business Method Patent Review CBM2015-00111 and CBM2015-00151, Nov. 9, 2015, 19 pgs.

Paper No. 10, Denying Institution of Covered Business Method Patent Review CBM2015-00112 and CBM2015-00152, Nov. 9, 2015, 18 pgs.

Perdue et al., "Conversant® 1 Voice System: Architecture and Applications," Jul. 17, 1986, AT&T Technical Journal, pp. 1-14.

Print outs of Internet web site, "Wildfire Communications, Inc.," Nov. 5, 1997, including print outs of the following web pages: http://www.wildfire.com; http://www.wildfire.com/consumerhome.html; http://wwwwildfire.com/106.html; http://www.wildfire.com/carrierhome.html; http://www.wildfire.com/sfandb.html; http://www.wildfire.com/about.html; http://www.wildfire.com/abtmgmt.html; http://www.wildfire.com/scoop.html; http://www.wildfire.com/intel.html/; and http://www.wildfire.com/msft.html. 17 pgs.

Putz, Steve, "Interactive Information Services Using World-Wide Web Hypertext," First Int'l Conference on World-WideWeb (May 25-27, 1994), 10 pgs.

Reply Brief of Appellant Parus Holdings, Inc., submitted on Sep. 6, 2016, to the United States Court of Appeal for the Federal Circuit, Appeal Nos. 2016-1179, -1180, and -1181, 40 pgs.

Sartori, "Speech Recognition," Apr. 1995, Mercury Communications, available at www.gar.co.uk/technology_watch/speech.htm (accessed Mar. 15, 2005), pp. 1-9.

Schmandt et al., "A Conversational Telephone Messaging Systems," IEEE Transactions on Consumer Electronics, 1984, vol. CE-30, No. 3, pp. xxi-xxiv.

Schmandt et al., "Phone Shell: The Telephone as Computer Terminal," ACM Multimedia, 1993, 11 pgs.

Schmandt et al., "Phone Slave: A Graphical Telecommunications Interface," Proceedings of the SID, 1985, vol. 26/1, pp. 79-82.

Shimamura et al., "Review of the Electrical Communication Laboratories," vol. 418(33), No. 1, Tokyo, Japan, 1985, pp. 31-39.

* cited by examiner

PERSONAL VOICE-BASED INFORMATION RETRIEVAL SYSTEM

CROSS-REFERENCE TO RELATED APPLICATIONS

The present application is a continuation of U.S. Utility application Ser. No. 15/193,517, entitled "Personal Voice-Based Information Retrieval System," filed Jun. 27, 2016, which is a continuation of U.S. Utility application Ser. No. 12/787,801, entitled "Personal Voice-Based Information Retrieval System," filed May 26, 2010, now U.S. Pat. No. 9,377,992, which is a continuation of U.S. Utility application Ser. No. 11/711,773, "Personal Voice-Based Information Retrieval System," filed Jun. 29, 2007, now abandoned, which is a continuation of U.S. Utility application Ser. No. 09/777,406, entitled "Personal Voice-Based Information Retrieval System," filed Feb. 6, 2001, now U.S. Pat. No. 7,516,190, which claims priority to U.S. Provisional Patent Application No. 60/180,343, entitled "Personal Voice-Based Information Retrieval System," filed Feb. 4, 2000, which are incorporated by reference herein in their entirety.

FIELD OF THE INVENTION

The present invention relates generally to the field of providing information IO access. In particular, the invention relates to a personalized system for accessing information from the Internet or other information sources using speech commands.

BACKGROUND OF THE INVENTION

Popular methods of information access and retrieval using the Internet or other computer networks can be time-consuming and complicated. A user must frequently wade through vast amounts of information provided by an information source or web site in order obtain a small amount of relevant information. This can be time-consuming, frustrating, and, depending on the access method, costly. A user is required to continuously identify reliable sources of information and, if these information sources are used frequently, repeatedly access these sources.

Current methods of accessing information stored on computer networks, such as Wide Area Networks (WANs), Local Area Network (LANs) or the Internet, require a user to have access to a computer While computers are becoming increasingly smaller and easier to transport, using a computer to access information is still more difficult than simply using a telephone. Since speech recognition systems allow a user to convert his voice into a computer-usable message, telephone access to digital information is becoming more and more feasible Voice recognition technology is growing in its ability to allow users to use a wide vocabulary.

Therefore, a need exists for an information access and retrieval system and method that allows users to access frequently needed information from information sources on networks by using a telephone and simple speech commands.

SUMMARY OF THE INVENTION

One object of the preferred embodiment of the present invention is to allow users to customize a voice browsing system.

A further object of the preferred embodiment is to allow users to customize the information retrieved from the Internet or other computer networks and accessed by speech commands over telephones.

Another object of the preferred embodiment is to provide a secure and reliable retrieval of information over the Internet or other computer networks using predefined verbal commands assigned by a user.

The present invention provides a solution to these and other problems by providing a new system for retrieving information from a network such as the Internet. A user creates a user-defined record in a database that identifies an information source, such as a web site, containing information of interest to the user. This record identifies the location of the information source and also contains a recognition grammar assigned by the user. Upon receiving a speech command from the user that is described in the assigned recognition grammar, a network interface system accesses the information source and retrieves the information requested by the user.

In accordance with the preferred embodiment of the present invention, a customized, voice-activated information access system is provided. A user creates a descriptor file defining specific information found on a web site the user would like to access in the future. The user then assigns a pronounceable name or identifier to the selected content and this pronounceable name is saved in a user-defined database record as a recognition grammar along with the URL of the selected web site.

In the preferred embodiment, when a user wishes to retrieve the previously defined web-based information, a telephone call is placed to a media server. The user provides speech commands to the media server that are described in the recognition grammar assigned to the desired search. Based upon the recognition grammar, the media server retrieves the user-defined record from a database and passes the information to a web browsing server which retrieves the information from associated web site. The retrieved information is then transmitted to the user using a speech synthesis software engine.

DETAILED DESCRIPTION OF THE PREFERRED EMBODIMENT

The present invention uses various forms of signal and data transmission to allow a user to retrieve customized information from a network using speech communication. In the preferred embodiment of the present invention, a user associates information of interest found on a specific information source, such as a web site, with a pronounceable name or identification word. This pronounceable name/ identification word forms a recognition grammar in the preferred embodiment. When the user wishes to retrieve the selected information, he may use a telephone or other voice enabled device to access a voice browser system. The user then speaks a command described in the recognition grammar associated with the desired information. The voice browsing system then accesses the associated information source and returns to the user, using a voice synthesizer, the requested information.

Figure 1:
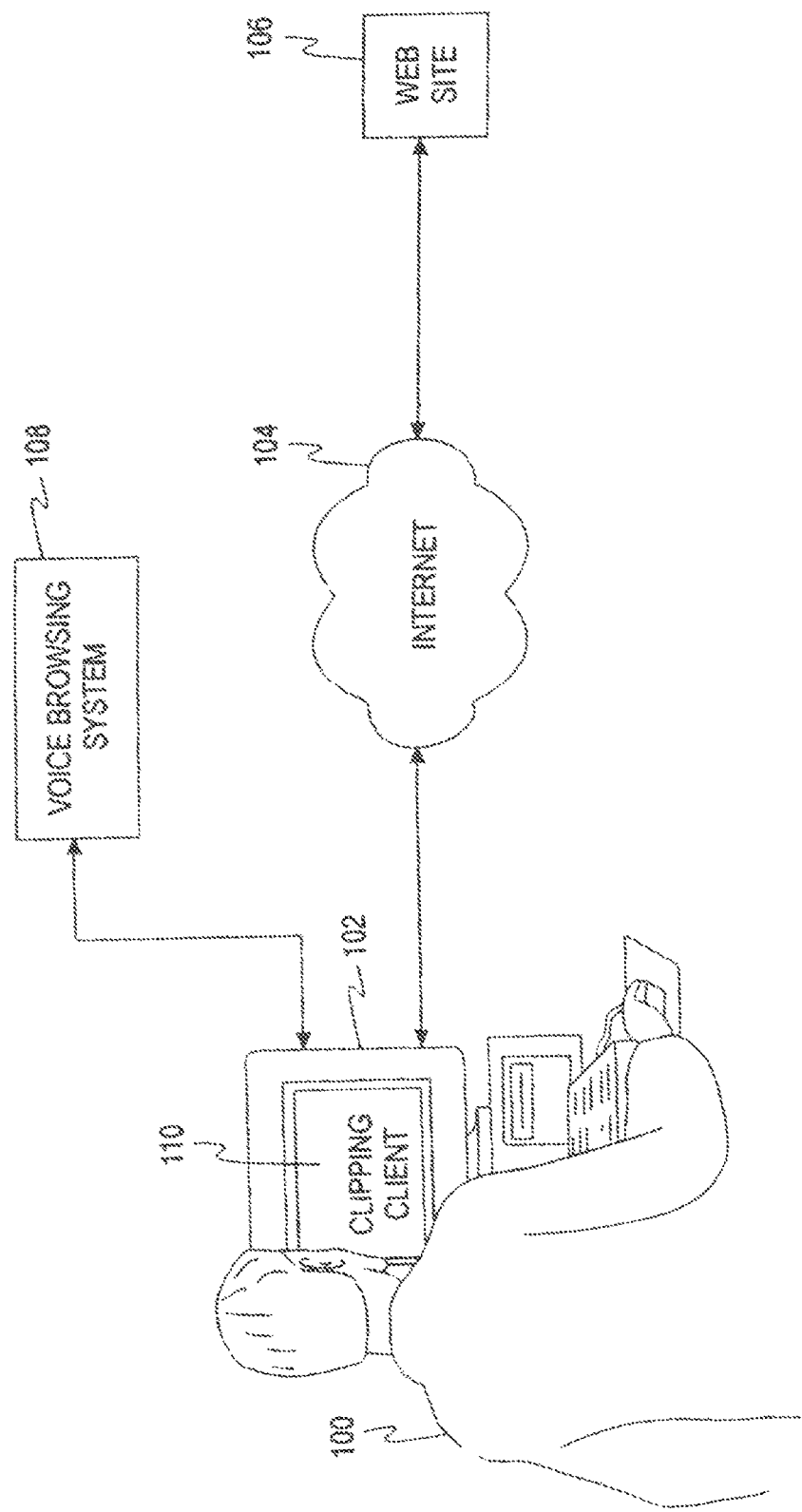
FIG. 1 displays a personal information selection system used with the preferred embodiment of the present invention.

Referring to FIG. 1, a user 100 uses a computer 102 to access a network, such as a WAN, LAN, or the Internet, containing various information sources [n the preferred embodiment, the user 100 access the Internet 104 and begins searching for web sites 106, which are information sources that contain information of interest to the user. When the user 100 identifies a web site 106 containing information the user would like to access using only a voice enabled device, such as a telephone, and the voice browsing system 108, the user initiates a "clipping client" engine 110 on his computer 102.

The clipping client 110 allows a user 100 to create a set of instructions for use by the voice browsing system 108 in order to report personalized information back to the user upon request. The instruction set is created by "clipping" information from the identified web site. A user 100 may be interested in weather for a specific city, such as Chicago. The user 100 identifies a web site from which he would like to obtain the latest Chicago weather information. The clipping client 110 is then activated by the user 100.

Figure 2:
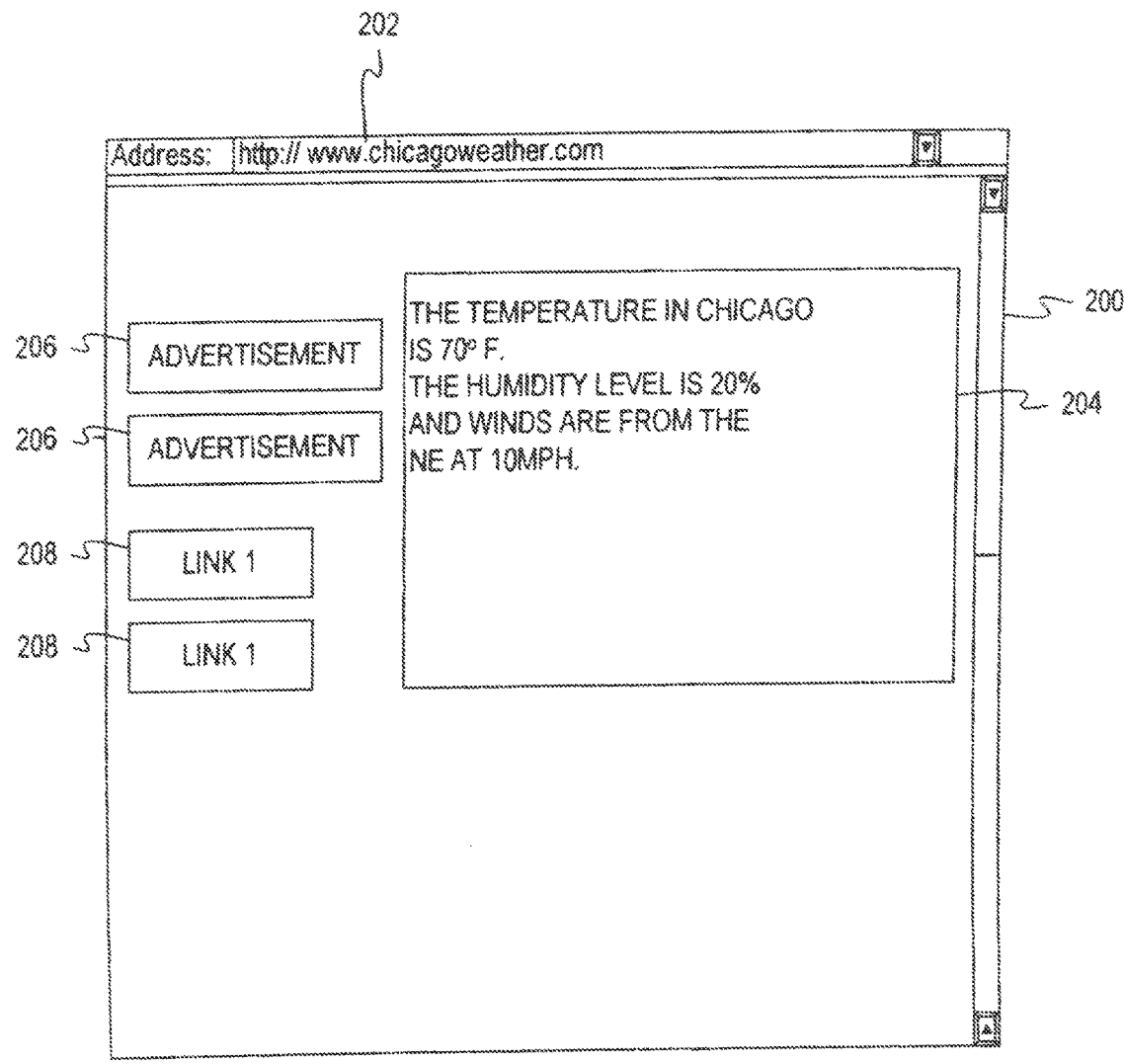
FIG. 2 displays a web page displayed by the clipping client of the preferred embodiment.

The clipping client 110 displays the selected web site in the same manner as a conventional web browser such as Microsoft's® Internet Explorer. FIG. 2 depicts a sample of a web page 200 displayed by the clipping client 110. The user 100 begins creation of the instruction set for retrieving information from the identified web site by selecting the uniform resource locator (URL) address 202 for the web site (i.e., the website address). In the preferred embodiment, this selection is done by highlighting and copying the URL address 202. Next, the user selects the information from the displayed web page that he would like to have retrieved when a request is made. Referring to FIG. 2, the user would select the information regarding the weather conditions in Chicago 204. The web page 200 may also contain additional information such as advertisements 206 or links to other web sites 208 which are not of interest to the user. The clipping client 110 allows the user to select only that portion of the web page containing information of interest to the user. Therefore, unless the advertisements 206 and links 208 displayed on the web page are of interest to the user, he would not select this information. Based on the web page information 204 selected by the user, the clipping client 110 creates a content descriptor file containing a description of the content of the selected web page. This content descriptor file indicates where the information selected by the user is located on the web page. In the preferred embodiment, the content descriptor file is stored within the web browsing server 302 shown in FIG. 3. The web browsing server 302 will be discussed below.

Table 1 below is an example of a content descriptor file created by the clipping client of the preferred embodiment. This content descriptor file relates to obtaining weather information from the web site www.cnn.com.

TABLE 1 table name : portalServices
column :
  service
content:
  weather
column:
  config
content:
  [cnn]
  Input=_zip
URL=http://cgi.cnn.com/cgi-bin/weather/redirect?zip=zip
Pre-filter="\n" "
Pre-filter=" < [ " <: > ] + >" "
Pre-filter=/\s+/ I
Pre-filter=" [ \ ( \) \ I ] " ! "
Output=_location
Output=first_day_name
Output=first_day_weather
Output=first_day_high_F
Output=first_day_high_C
Output=first_day_low_F
Output=first_day_low_c
Output=second_day_name
Output=second_day_weather
Output=second_day_high_F
Output=second_day_high_C
Output=second_day_low_F
Output=second_day_low_C
Output=third_day_name
Output=third_day_weather
Output=third_day_high_F
Output=third_day_high_C
Output=third_day_low_F
Output=third_day_low_C
Output=fourth_day_name
Output=fourth_day_weather
Output=fourth_day_high_F
Output=fourth_day_high_C
Output=fourth_day_low_F
Output=fourth_day_low_C
Output=undef
Output=_current_time
Output=fourth_day_low_C
Output=undef
Output=_current_time
Output=_current_month
Output=_current_day
Output=_current_weather
Output=_current_temperature_F
Output=_current_temperature_C
Output=_humidity
Output=_wind
Output=_pressure
Output=_sunrise
Output=_sunset
  Regular_expression=WEB SERVICES: (.+) Forecast FOUR-DAY
  FORECAST (\S+)
(\S+) HI
GH (\S+) F (\S+) C LOW (\S+) F (\S+) C (\S+) (\S+) HIGH (\S+) F (\S+)
C LOW
(\S+
) F (\S+) C (\S+) (\S+) HIGH (\S+) F (\S+) C LOW (\S+) F
(\S+) C (\S+) (\S+)
HIG
H −(\S+) C LOW (\S+) F (\S+) C WEATHER MAPS RADAR ( .+)
Forecast
CURRENT C
ONDITIONS (.+) !local!, (\S+) (\S+) (.+) Temp: (\S+) F,
(\S+) C Rel.
Humidity: (
\S+) Wind: (.+) Pressure: ( .+) Sunrise: ( .+) Sunset: ( .+)

Finally, the clipping client 110 prompts the user to enter an identification word or phrase that will be associated with the identified web site and information. For example, the user could associate the phrase "Chicago weather" with the selected URL 202 and related weather information 204. The identification word or phrase is stored as a personal recognition grammar that can now be recognized by a speech recognition engine of the voice browsing system 108 which will be discussed below. The personal recognition grammar, URL address 202, and a command for executing a content extraction agent are stored within a database used by the voice browser system 108 which will be discussed below.

The voice browsing system 108 used with the preferred embodiment will now be described in relation to FIG. 3. A database 300 designed by Webley Systems Incorporated is connected to one or more web browsing servers 302 as well as to one or more media servers 304. The database may store information on magnetic media, such as a hard disk drive, or it may store information via other widely acceptable methods for storing data, such as optical disks. The media servers 304 function as user interface systems that provide access to the voice browsing system 108 from a user's voice enabled device 306 (i.e., any type of wireline or wireless telephone, Internet Protocol (IP) phones, or other special wireless units). The database 300 contains a section that stores the personal recognition grammars and related web site information generated by the clipping client 110. A separate record exists for each web site defined by the user. An example of a user-defined web site record is shown in FIG. 4. Each user-defined web site record 400 contains the recognition grammar 402 assigned by the user, the associated Uniform Resource Locator (URL) 404, and a command that enables the "content extraction agent" 406 and retrieves the appropriate content descriptor file required to generate proper requests to the web site and to properly format received data. The web-site record 400 also contains the timestamp 408 indicating the last time the web site was accessed. The content exaction agent is described in more detail below.

The database 300 may also contain a listing of pre-recorded audio files used to create concatenated phrases and sentences. Further, database 300 may contain customer profile information, system activity reports, and any other data or software servers necessary for the testing or administration of the voice browsing system 108.

Figure 5:
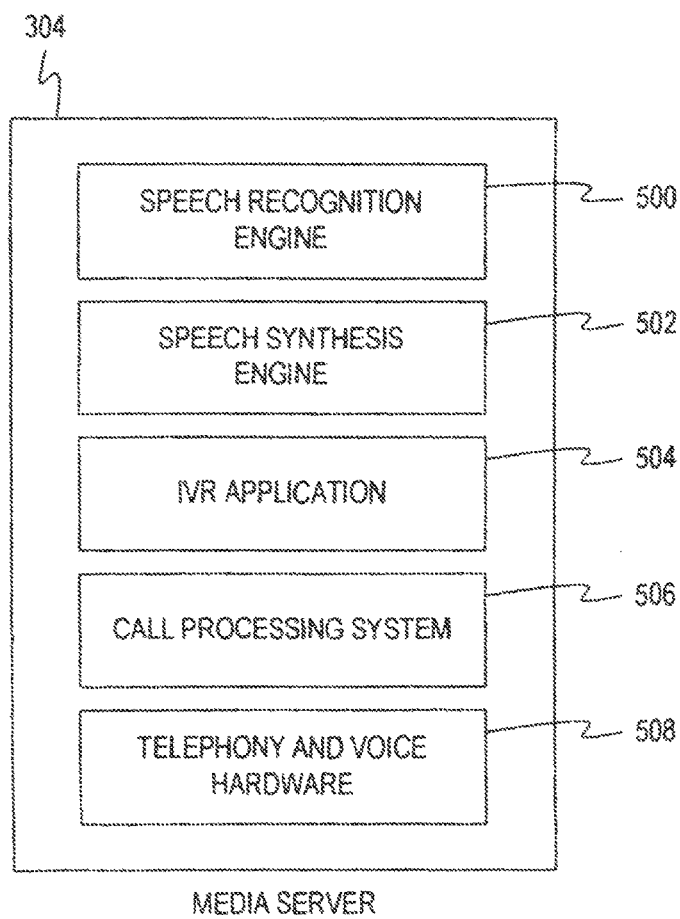
FIG. 5 is a block diagram of a media server used by the preferred embodiment.

The operation of the media servers 304 will now be discussed in relation to FIG. 5. The media servers 304 function as user interface systems since they allow a user to access the voice browsing system 108 via a voice enabled device 306. In the preferred embodiment, the media servers 304 contain a speech recognition engine 500, a speech synthesis engine 502, an Interactive Voice Response (IVR) application 504, a call processing system 506, and telephony and voice hardware 508 that is required to enable the voice browsing system 108 to communicate with the Public Switched Telephone Network (PSTN) 308. In the preferred embodiment, each media server is based upon Intel's Dual Pentium III 730 MHz microprocessor system.

The speech recognition function is performed by a speech recognition engine 500 that converts voice commands received from the user's voice enabled device 10 (i.e., any type of wire line or wireless telephone, Internet Protocol (IP) phones, or other special wireless units) into data messages. In the preferred embodiment voice commands and audio messages are transmitted using the PSTN 308 and data is transmitted using the TCP/IP communications protocol. However, one skilled in the art would recognize that other transmission protocols may be used. Other possible transmission protocols would include SIP/VoIP (Session Initiation Protocol/Voice over IP), Asynchronous Transfer Mode (ATM) and Frame Relay. A preferred speech recognition engine is developed by Nuance Communications of 1380 Willow Road, Menlo Park, Calif. 94025 (www.nuance.com) The Nuance engine capacity is measured in recognition units based on CPU type as defined in the vendor specification The natural speech recognition grammars (i.e., what a user can say that will be recognized by the speech recognition engine) were developed by Webley Systems.

In the preferred embodiment, when a user access the voice browsing system 108, he will be prompted if he would like to use his "user-defined searches." If the user answers affirmatively, the media servers 304 will retrieve from the database 300 the personal recognition grammars 402 defined by the user while using the clipping client 10.

The media servers 304 also contain a speech synthesis engine 502 that converts the data retrieved by the web browsing servers 302 into audio messages that are transmitted to the user's voice enabled device 306. A preferred speech synthesis engine is developed by Lernout and Hauspie Speech Products, 52 Third Avenue, Burlington, Mass. 01803 (www.lhslcom).

Figure 6:
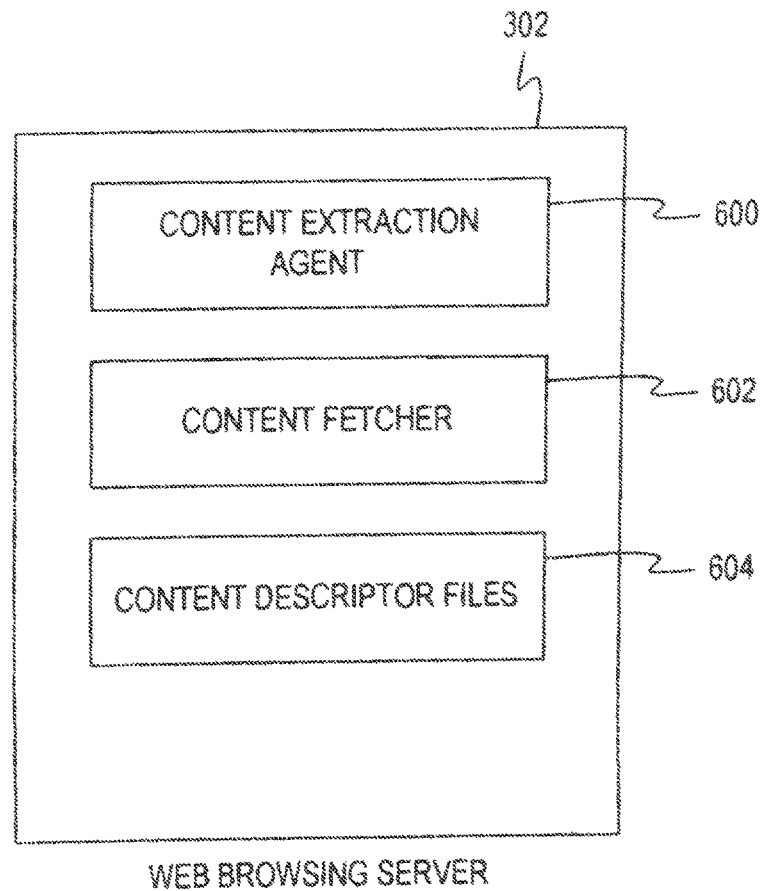
FIG. 6 is a block diagram of a web browsing server used by the preferred embodiment.

A further description of the web browsing server 302 will be provided in relation to FIG. 6. The web browsing servers 302 provide access to data stored on any computer network including the Internet 104, WANs or LANs. The web browsing servers 302 receive responses from web sites 106 and extract the data requested by the user. This task is known as "content extraction." The web browsing server 302 is comprised of a content extraction agent 600, a content fetcher 602, and the content descriptor file 604. Each of these are software applications and will be discussed below.

Upon receiving a user-defined web site record 400 from the database 300 in response to a user request, the web browsing server 302 invokes the "content extraction agent" command 406 contained in the record 400. The content extraction agent 600 retrieves the content descriptor file 604 associated with the user-defined record 400. As mentioned, the content descriptor file 604 directs the extraction agent where to extract data from the accessed web page and how to format a response to the user utilizing that data. For example, the content descriptor file 604 for a web page providing weather information would indicate where to insert the "city" name or ZIP code in order to retrieve Chicago weather information. Additionally, the content descriptor file 604 for each supported URL indicates the location on the web page where the response information is provided. The extraction agent 600 uses this information to properly extract from the web page the information requested by the user.

The content extraction agent 600 can also parse the content of a web page in which the user-desired information has changed location or format. This is accomplished based on the characteristic that most hypertext documents include named objects like tables, buttons, and forms that contain textual content of interest to a user. When changes to a web page occur, a named object may be moved within a document, but it still exists. Therefore, the content extraction agent 600 simply searches for the relevant name of desired object. In this way, the information requested by the user may still be found and reported regardless of changes that have occurred.

Table 2 below contains source code for a content extraction agent 600 used by the preferred embodiment.

TABLE 2

```
# ! /usr/ local/www/bin/sybperl5
#$Header:
/usr/local/cvsroot/webley/agents/service/web_dispatch.pl,v
1.6
```

TABLE 2-continued

```
# Dispatches all web requests
#http://wcorp.itn.net/cgi/flstat?carrier=ua&flight_no=155&m
cn_abbr=jul&date=
6&stamp=ChLN~PdbuuE*itn/ord,itn/cb/sprint_hd
#http://cig.cnnfn.com/flightview/rlm?airline=amt&number=300
require "config_tmp.pl";
# check parameters
die "Usage: $0 service [params]\n" if $#ARGV < 1;
#print STDERR @ARGV;
# get parameters
my ( $service, @param ) = @ARGV;
# check service
My ($services = (
                            weather_cnn => 'webget.pl weather_cnn',
                            weather_lycos => 'webget.pl
'weather_lycos',
                            weather_weather => 'webget.pl
weather_weather',
                            weather_snap => 'webget.pl
weather_snap',
                            weather_infospace => 'webget.pl
weather_infospace',
                            stockQuote_yahoo => 'webget.pl stock',
                            flightStatus_itn => 'webget.pl
flight_delay',
                            yellowPages_yahoo => 'yp_data.pl',
                            yellowPages_yahoo => 'yp_data.pl',
                            newsHeaders_newsreal => 'news.pl',
                            newsArticle_newsreal => 'news.pl',
                            ) ;
# test param
my $date= 'date';
chop ( $date );
my ( $short_date ) = $date =~ / \s+(\{w3}\s+\d{1, 2}) \s+/;
my % Test = (
                            weather_cnn => '60053',
                            weather_lycos => '60053',
                            weather_weather => '60053',
                            weather_snap => '60053',
                            weather_infospace => '60053',
                            stockQuote_yahoo => 'msft',
                            flightStatus_itn => 'ua 155 ' .
$short_date,
                            yellowPages_yahoo => 'tires 60015',
                            newsHeaders_newsreal => ' 1 ',
                            newsArticle_newsreal => '1 1 ',
                            ) ;
die "$date: $0: error: no such service: $service (check
this script) \n"
unless $Services{ $service };
# prepare absolute path to run other scripts
my ( $path, $script ) = $0 =~ ml^ (.*/) ([ ^ / ] * ) | ;
# store the service to compare against datatable
my $service_stored = $service;
# run service
While ( ! ( $response = '$path$Services { $service } @param' )
) {
                            # response failed
                            # check with test parameters
                            $ response = '$path$Services { $service } $Test{
$service }";
                            If ( response ) {
                                        $service = &switch_service ( $service ) ;
#                                       print "wrong paramnet values were supplied:;
$service -
@param\n";
#                                       die "$date: $0: error: wrong parameters: $service
-
@param\n";
                            }
                            else {
                                        # change priority and notify
                                        $service = &increase_attempt ( $service ) ;
                            }
}
# output the response
print $response;
```

TABLE 2-continued

```
sub increase_attempt {
            my ( $service ) = @_;
            my ( $service_name ) = split( /_/, $service ) ;
            print STDERR "$date: $0: attn: changing priority for
service:
$service\n";
            # update priority
            &db_query ( "update mcServiceRoute "
                        ."set priority = ( select max ( priority
) from
mcServiceRoute "
                        . "where service = '$service name' ) + 1,
                        . "date = getdate ( ), "
                        . "attempt = attempt + 1 "
                        . "where route = '$script $service' " ) ;
#           print "---$route===\n";
            # find new route
            my $route @{ &db_query( "select route from
mcServiceRoute "
                        ."where service =
'$service_name' "
                        ."and attempt < 5
"
                        . "order by
priority ")
                        } -> [ 0 ] { route };
            &db_query( "update mcServiceRoute "
                        . "set attempt = 0 "
                        . "where route = '$script $service' " ) ;
            if ( $route eq "$script $service_stored" ) ;
            ( $service_name, $service ) =split ( /\s+/, $route ) ;
            die "$date: $0: error: no route for the service:
$service (add
More) \n""
            unless $service;
            return $service;
}
sub switch service {
            my ( $service ) = @_;
            my ( $service_name) = split (/_/, $service );
            print STDERR "$date: $0: attn: changing priority for
service:
$service\n";
            # update priority
            &db_query ( "update mcServiceRoute "
                        . "set priority = ( select max ( priority for
) from
mcServiceRoute "
                        . "where service = '$service_name' ) + 1,
                        . "date ~ getdate ( ) "
                        . "where route = '$script $service' " ) ;
#           print "---$route===\n";
            # find new route
            my $route = @( &db_query ( "select route from
mcServiceRoute "
                        ."where service =
'$service_name' "
                        . "and attempt < 5
"
                        . "order by
priority ")
                        } -> [ 0 ] { route };
            die " $ date : $ 0 : error : there is the only service:
$route (add
more) \n"
            if ( $route eq "$script $service"
                        or $route eq "$script $service_stored" ) ;
            (service_name, $service ) = split ( / \s+/, $route ) ;
            die "$date: $0: error: no route for the service:
$service (add
more)\n"
            unless $service;
            return $service;
}
```

Table 3 below contains source code of the content fetcher 602 used with the content extraction agent 600 to retrieve information from a web site

TABLE 3

```
#!/usr/local/www/bin/sybper15
# -T
# -w
# $Header:
/usr/local/cvsroot/webley/agents/service/webget.pl, v 1.4
# Agent to get info from the web.
# Parameters: service_name [service_parameters], i.e. stock msft or weather
60645
# Configuration stored in files service_name.ini
# if this file is absent the configuration is received from mcServices table
# This script provides autoupdate to datatable if the .ini file is newer.
$debug = 1;
use URI : : URL;
use LWP : : UserAgent;
use HTTP : :Request: : Common;
use Vail : :VarList;
use Sybase : : CT lib;
use HTTP: :Cookies;
#print "Sybase: :CT lib $DB_USR, $DB_PWD, $DB SRV;";
Open ( STDERR, ">>$0.log" ) if $debug;
#open ( STDERR, ">&STDOUT" ) ;
$log = 'date';
#$response = '.url.pl
http://cgi.cnn.com/cgi-bin/weather/redirect?zip=60605";
#$response= 'pwd';
#print STDERR "pwd = $response\n";
#$response = 'ls' ;
#print STDERR "ls = $response\n";
chop ( $log ) ;
$log . = "pwd="   . 'pwd' ;
chop ( $log ) ;
#$debug2 = 1;
my $service = shift;
$log .= " $service: ". join( ' : ', @ARGV ) . "\n";
print STDERR $log if $debug;
#$response = • . /url .pl
"http://cgi.cnn.com/cgi-bin/weather/redirect?zip=60605";
my @ini = &read_ini ( $service ) ;
chop ( @ ini ) ;
my $section= " ";
do ($section = &process_section( $section ) } while
$section;
#$response = ' ./url.pl
http://cgi.cnn.com/cgi-bin/weather/redirect?zip=60605" ' ;
exit;
#########################################################
sub read_ini {
        my ( $service ) = @_;
        my @ini = ( );
        # first, try to read file
        $0 =~ m|^ ( .*/) [ /];
        $service = $1 . $service;
        if ( open( INI, "$service.ini" ) ) {
                @ini = ( < INI > ) ;
                return @ini unless ( $DB_SRV ) ;
                # update datatable
                my $file_time = time - int ( ( -M "$service. ini" )
* 24 *
3600 ) ;
#               print "time $file_time\n";
                my $dbh = new Sybase: :CTlib $DB_USR,   $DB_PWD,
$DB_SRV;
                unless ( $dbh) {
                        print STDERR "webget.pl: Cannot connect to
dataserver $DB_SRV:$DB_USR:$DB_PWD\n";
                        return @ini;
                }
                my @row_refs = $dbh->ct_sql ( "select lastUpdate
from
mcServices where service = '$service' ", undef, 1 );
                if ($dbh -> { RC } == CS_FAIL ) {
                        print STDERR "webget.pl: DB select from
mcServices
failed\n";
                        return @ini;
                }
```

TABLE 3-continued

```
                unless ( defined @row_refs ) {
                # have to insert
                my ( @ini_escaped ) = map {
                        ( my $x = $_) =~ s/ \ ' / \ ' / g;
                        $x;
                }@ini;
                $dbh -> ct_sql ( "insert mcServices values (
'$service',
'@ini_escaped', $file time; ) ");
                if ( $dbh -> { RC } == CS_FAIL )
                        print STDERR "webget.pl: DB insert to
mcServic:es failed\n";
                }
                return @ ini;
#               print "time $file_time:"$row_refs [ 0 ] -> {
'lastUpdate'
}."\n";
                If ( $file_time -> ref_refs [0 ] -> { 'last update'
} ) {
                # have to update
        my ( @ini_escaped = map {
                ( my $x = $_ ) =~ s/ \ ' / \ ' \ ' /g;
                $x;
        } @ini;
                $dbh -> ct_sql ( "update mcServices set config
=
'@ini_escaped', lastUpdate = $file_time where service =
'$service' " );
                if ( $dbh -> { RC } - CS_FAIL ) {
                        print STDERR "webget.pl: DB update to
mcServices failed\n";
                }
                }
                return @ini;
        }
        else {
        print STDERR "$0: WARNING: $service.ini n/a in "
. - 'pwd'
                . "Try to read DB\n";
        }
        # then try to read datatable
        die "webget.pl: Unable to find service $service\n"
unless ( $DB_SRV
) ;
        my $dbh = new Sybase: : CTlib $DB_USR, $DB_PWD, $DB_SRV;
        die "webget.pl: Cannot connect to dataserver
$DB SRV: $08 USR: $08 PWD\n" unless ( $dbh ) ;
my @row_refs = $dbh->ct sql ( "";elect con.fiJ from
mcServices where
service = '$service' " , undef, 1 );
        die "webget.pl: DB select from mcServices failed\n" if
$dbh -> { RC }
= = CS FAIL;
        die "webget.pl: Unable to find service $service\n"
unless ( defined
@row_refs ) ;
        $row_refs [ 0 ] -> { 'config' } =~ s/\n /\n\r/g;
        @ini = split ( /\r/, $row_refs [ 0 ] ->{ 'config' } ) ;
        return @ini;
###############################################################
sub process_section {
        my ($prev_section ) = @_;
        my ($section, $output, $content );
        my %PAram;
        my %Content;
#       print" ###############################\n";
        foreach (@ini ) {
#               print;
#               chop;
                s/\s+$//;
                s/ \[(.*) \ ] ) {
                # get section name
                if ( / \ [(.*) \ ] ) {
#                       print "$_: $section:$prev_section\n";
                        last if $section;
                        next if $1 eq "print";
#               next if $prev_section ne " " and
$prev_section ne $1;
```

TABLE 3-continued

```
                if ($prev_section eq $1 )
                        $prev_section = " ";
                        next;
                }
                $section = $1;
        }
        # get parameters
        Push ( @{ $Param{ $1 } }, $2 ) if $section and
/ ( [ ^ = ] +) = (.*) /;
        }
#       print"++++++++++++++++++++++++++++++++++\n";
        return 0 unless $section;
#       print "section $section\n";
        # substitute parameters with values
        map { $Param{ URL }->[ 0 ] =~ s/$Param{ Input }->[ $_
] /$ARGV [ $_
] /g
        }0 . . S# { $Param{ Input } };
        # get page content
        ( $Content{={ 'TIME' }, $content ) = get_url_content (
$ { $ Param { URL
} } [ 0 ] ) ;
        # filter it
        map {
                if (/\"(["\"]+)\"(["\"]*)\"/or
/\/(["\/]+)\/(["\/]*)\//)
(
                        my $out = $2; $content =~ s/$1/$out/g;
                }
        } @ ($Param{ "Pre-filter"}};
#print STDERR $content;
        # do main regular expression
        unless ( @values = $content =~ / $! Param {
Regular expression } } [ 0
] / ) (
                &die_hard ( $ { $Param(Regular_expression } } [ 0
], $content
) ;
                return $section;
        }
        %Content = map { ( $Param{ Output }->[ $_] , $values [
$_ ] )
        } 0 . . $ # ( $Param { Output } ) ;
        # filter it
        map {
                if ( / ( [ ^\"]+)\"] +) \" ( ["\"]+) \" ( ["\"]*) \"/
                        or / ( [ ^\/]+) \/ ( [ ^\/] +) \/ ([ ^\/]*) \/ / ) (
                        my $out = $3;
                        $Content{ $1 } =~ s/$2/$out/g;
                }
}       @{ $Param { "Post-filter" } };
#calculate it
map
# calculate it
map {
                if ( /(["'=]+)=(.*)/
                        my $eval = $2;
                        map { $eval =~ s/$_/$Content( $_ }/g
                        } keys %Content;
                        $Content{ $1 } = eval( $eval ) ;
                }
        }
} @{ ( $ Param{ Calculate } } ;
# read section [print]
foreach $i ( 0 .. $#ini ) {
                next unless $ini [ $i] /^\ [print\]/;
                foreach ( $i + 1 . . $#ini ) {
                        last if $ini [ $_ ] =~ /^\ [.+\]/;
                        $output .= $ini [$_1] . "\n";
                }
                last;
}
# prepare output
map { $output =~ s/$_/$Content{ $_ }/g
} keys %Content;
print $output;
return 0;
}
```

TABLE 3-continued

```
###########################################################
sub get_url_content [
        my ( $url ) = @_;
        print STDERR $url if $debug;
        $response = ' ./url.pl '$url' ;
        $response = ' ./url.pl '$url' ;
        Return ( $time − time, $response );
        my $ua = LWP: :UserAgent −> new;
        $ua −> agent ( 'Mozilla/4.0 [en] (X11; I; FreeBSD 2.2.8-
STABLE i386)'
);
#       $ua −> proxy( ['http', 'https'],
'http://proxy.webley:3128/' ) ;
#       $ua −> no_proxy ('webley', 'vail' ) ;
        my $cookie = HTTP: :Cookies −>new;
        $ua −> cookie_jar ( $cookie ) ;
        $url = url $url;
        print "$url\n" if $debug2;
        my $time = time;
        my $res= $ua −> request ( GET $url ) ;
        print "Response: " . ( time − $time ) . "sec\n" if
$debug2;
        Return ( $time − time, $res −> content ) ;
}
###########################################################
sub die hard {
my ( $re, $content ) = @_;
-       my ( $re_end, $pattern );
while ( $content ! ~ /$re/ ) {
        if ($re =~ s/ (\({^\(\) ]+\) [^\(\)]*$) / / ) {
                $re_end = $1 . $re_end;
        }
        else }
                $re_end = $re;
                last;
        }
        }
        $content=~ /$re/;
$re\n
Possible misuse:
$re_end: \n
Matched:
$&\n
Mismatched:
$'\n
" if $debug;
        if ( $debug ) {
                print STDERR "Content:\n $content\n" unless
$';
        }
}
###########################################################
```

Once the web browsing server 302 accesses the web site specified in the CRL 404 and retrieves the requested information, it is forwarded to the media server 304. The media server uses the speech synthesis engine 502 to create an audio message that is then transmitted to the user's voice enabled device 306. In the preferred embodiment, each web browsing server is based upon Intel's Dual Pentium III 730 MHz microprocessor system.

Figure 3:
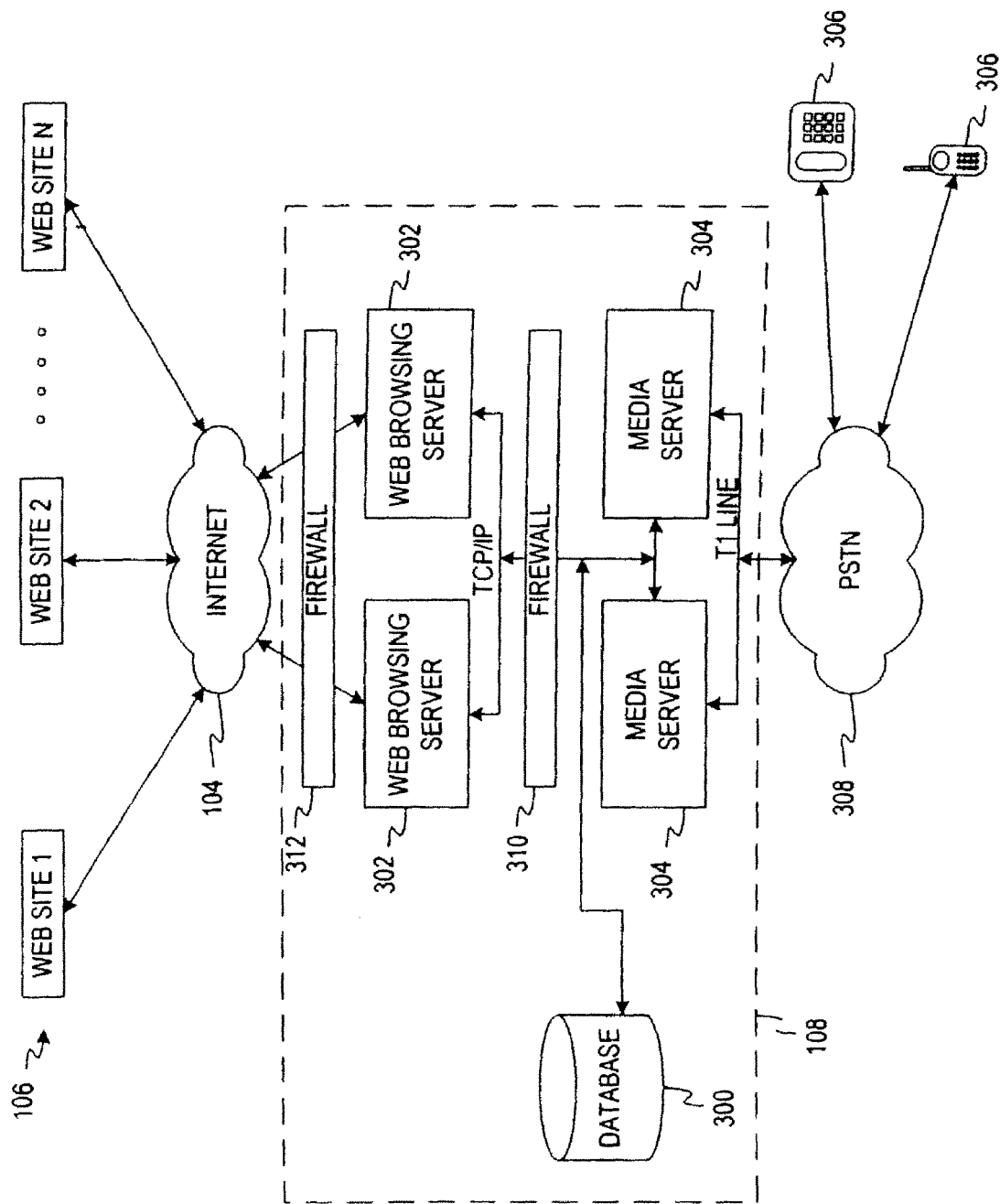
FIG. 3 is a block diagram of a voice browsing system used with preferred embodiment of the present invention.
Figure 4:
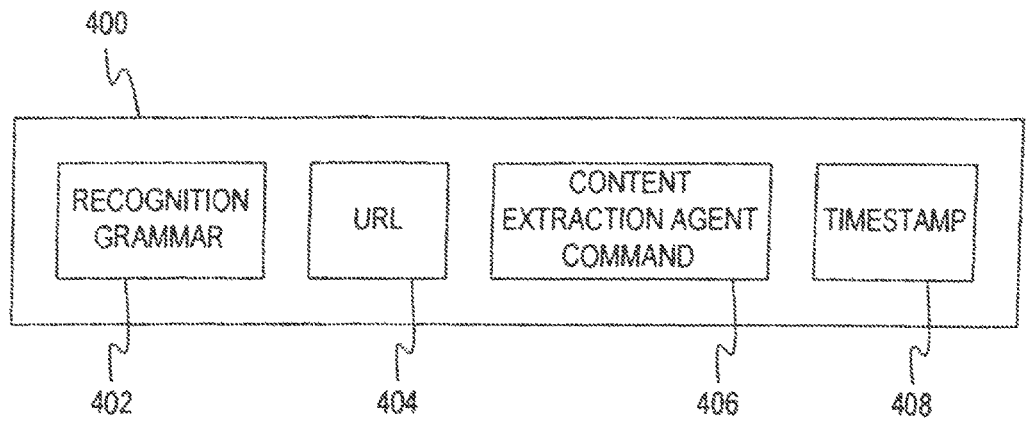
FIG. 4 is a block diagram of a user-defined database record created by preferred embodiment of the present invention.

Referring to FIG. 3, the operation of the personal voice-based information retrieval system will be described. A user establishes a connection between his voice enabled device 306 and a media server 304 of the voice browsing system 108. This may be done using the Public Switched Telephone Network (PSTN) 308 by calling a telephone number associated with the voice browsing system 108. Once the connection is established, the media server 304 initiates an interactive voice response (IVR) application. The IVR application plays audio message to the user presenting a list of IO options, which includes "perform a user-defined search." The user selects the option to perform a user-defined search by speaking the name of the option into the voice enabled device 306.

The media server 304 then accesses the database 300 and retrieves the personal recognition grammars 402. Using the speech synthesis engine 502, the media server 304 then asks the user, "Which of the following user-defined searches would you like to perform" and reads to the user the identification name, provided by the recognition grammar 402, of each user-defined search. The user selects the desired search by speaking the appropriate speech command or pronounceable name described within the recognition grammar 402. These speech recognition grammars 402 define the speech commands or pronounceable names spoken by a user in order to perform a user-defined search. If the user has a multitude of user-defined searches, he may speak the command or pronounceable name described in the recognition grammar 402 associated with the desired search at anytime without waiting for the media server 304 to list all available user-defined searches. This feature is commonly referred to as a "barge-in" feature. The media server 304 uses the speech recognition engine 500 to interpret the speech commands received from the user. Based upon these commands, the media server 304 retrieves the appropriate user-defined web site record 400 from the database 300. This record is then transmitted to a web browsing server 302. A firewall 310 may be provided that separates the web browsing server 302 from the database 300 and media server 304. The firewall provides protection to the media server and database by preventing unauthorized access in the event the firewall 312 for the web browsing server fails or is compromised. Any type of firewall protection technique commonly known to one skilled in the art could be used, including packet filter, proxy server, application gateway, or circuit-level gateway techniques.

The web browsing server 302 accesses the web site 106 specified by the URL 404 in the user-defined web site record 400 and retrieves the user-defined information from that site using the content extraction agent and specified content descriptor file specified in the content extraction agent command 406. Since the web browsing server 302 uses the URL and retrieves new information from the Internet each time a request is made, the requested information is always updated.

The content information received from the responding web site 106 is then processed by the web browsing server 302 according to the associated content descriptor file This processed response is then transmitted to the media server 304 for conversion into audio messages using either the speech synthesis engine 502 or selecting among a database of prerecorded voice responses contained within the database 300.

It should be noted that the web sites accessible by the personal information retrieval system and voice browser of the preferred embodiment may use any type of mark-up language, including Extensible Markup Language (XML), Wireless Markup Language (WML), Handheld Device Markup Language (HDML), Hyper Text Markup Language (HTML), or any variation of these languages.

The descriptions of the preferred embodiments described above are set forth for illustrative purposes and are not intended to limit the present invention in any manner. Equivalent approaches are intended to be included within the scope of the present invention. While the present invention has been described with reference to the particular embodiments illustrated, those skilled in the art will recognize that many changes and variations may be made thereto without departing from the spirit and scope of the present invention. These embodiments and obvious variations thereof are contemplated as falling within the scope and spirit of the claimed invention.

The invention claimed is:

1. A method, comprising:
   (a) receiving a speech command from a voice-enabled device of a particular user, over a network, by a speech-recognition engine coupled to a media server by an interactive voice response application including a user-defined search, the speech-recognition engine adapted to convert the speech command into a data message, the media server adapted to identify and access at least one or more websites containing information of interest to the particular user, the speech-recognition engine adapted to select particular speech-recognition grammar describing the speech command received and assigned to fetching content relating to the data message converted from the speech command and assigned to the user-defined search including a web request, along with a uniform resource locator of an identified web site from the one or more websites containing information of interest to the particular user and responsive to the web request;
   (b) selecting, by the media server, at least one information-source-retrieval instruction stored for the particular speech-recognition grammar in a database coupled to the media server and adapted to retrieve information from the at least one or more websites;
   (c) accessing, by a web-browsing server, a portion of an information source to retrieve information relating to the speech command, by using a processor of the web-browsing server, which processor (i) performs an instruction that requests information from an identified web site, (ii) utilizes a command to execute a content extractor within the web-browsing server to separate a portion of information that is relevant from other information on the web page using a name of a named object including the information, the information derived from only a portion of the web page containing information pertinent to the speech command, the content extractor adapted to use a content-descriptor file containing a description of the portion of information and the content-descriptor file adapted to indicate a location of the portion of the information within the information source;
   (d) selecting, by the web-browsing server, the information relating to the speech command from the information source and retrieving only the portion of the information requested by the speech command according to the at least one information-source-retrieval instruction;
   (e) converting the information retrieved from the information source into an audio message by a speech-synthesis engine, the speech-synthesis engine coupled to the media server; and
   (f) transmitting the audio message by the voice-enabled device to the particular user.

2. The method of claim 1, wherein the speech command is received by at least one of a landline telephone, a wireless telephone, and an Internet Protocol telephone and the media server is operatively connected to at least one of a local-area network, a wide-area network, and the Internet.

3. The method of claim 2, wherein the media server functions as a user-interface system adapted to provide access to a voice-browsing system.

4. The method of claim 2, further comprising:
   a clipping engine adapted to initially generate the content-descriptor file that indicates the location of the portion of the information within the identified web site.

5. A voice-browsing system for retrieving information from an information source that is periodically updated with current information, by speech commands received from a particular user provided via a voice-enabled device after establishing a connection between the voice-enabled device and a media server of the voice-browsing system, said voice-browsing system comprising:
   (a) a speech-recognition engine including a processor and coupled to the media server, the media server initiating a voice-response application once the connection between the voice-enabled device and the voice-browsing system is established, the speech-recognition engine adapted to receive a speech command from a particular user via the voice-enabled device, the media server configured to identify and access the information source via a network, the speech-recognition engine adapted to convert the speech command into a data message by selecting speech-recognition grammar established to correspond to the speech command received from the particular user and assigned to perform searches;

(b) the media server further configured to select at least one information-source-retrieval instruction corresponding to the speech-recognition grammar established for the speech command, the at least one information-source-retrieval instruction stored in a database associated with the media server and adapted to retrieve information;

(c) a web-browsing server coupled to the media server and adapted to access at least a portion of the information source to retrieve information indicated by the speech command, by using a processor of the web-browsing server, which processor (i) performs an instruction that requests information from an identified web page within the information source, and (ii) utilizes a command to execute a content extractor within the web-browsing server to separate a portion of the information from other information, the information derived from only a portion of a web page containing information relevant to the speech command, wherein the content extractor uses a content-descriptor file containing a description of the portion of information and wherein the content-descriptor file indicates a location of a portion of the information within the information source, and selecting, by the web-browsing server, an information type relevant from the information source and retrieving only a portion of the information that is relevant according to the at least one information-source-retrieval instruction; and (d) a speech-synthesis engine including a processor and coupled to the media server, the speech-synthesis engine adapted to convert the information retrieved from the information source into audio and convey the audio by the voice-enabled device.

6. The voice-browsing system claim 5, further comprising:

an interface to an associated website by the network to locate requested information.

7. The voice-browsing system of claim 5, wherein the voice-enabled device accesses the voice-browsing system by at least one of a landline telephone, a wireless telephone, and an Internet Protocol telephonic connection and wherein the media server operatively connects to the network, by at least one of a local-area network, a wide-area network, and the Internet.

8. The voice-browsing system of claim 5, wherein the media server functions as a user-interface system adapted to provide access to a voice-browsing system.

9. The voice-browsing system of claim 5, further comprising:

a clipping engine adapted to generate the content-descriptor file, by which, an instruction is used by the web-browsing server to request information from the identified web site and the information is displayed on the voice-enabled device, wherein the information is only the portion of the web page containing information relevant to the speech command.

10. A method of selectively retrieving information in response to spoken commands received by a voice-browsing system, the method comprising:

(a) identifying, one of a plurality of speech commands of a speech-recognition lexicon, based on audio data indicative of words spoken into a microphone of an electronic-communication device of a user;

(b) using the identified speech command to access a corresponding descriptor file from a plurality of descriptor files stored in a database associated with the voice-browsing system, and using the corresponding descriptor file to identify (i) a web-accessible information source, and (ii) request information;

(c) using the request information to fetch, from the information source identified by an accessed descriptor file, response data including a named object including content;

(d) using the named object to extract the content from the response data;

(e) generating audio response data containing indicia of a message for the user, which message is responsive to the identified speech command, and which message is based on the extracted content; and (f) directing a command to play the audio response data using the electronic-communication device of the user.

11. The method of claim 10, wherein the content is located in the response data using the named object regardless of the location of the named object within the response data.

12. The method of claim 11, wherein the fetching occurs on a web browsing server, and wherein the web browsing server receives the identified speech command from a different server.

13. The method of claim 12, further comprising: using Internet Protocol to communicate with the electronic-communication device of the user.

14. The method of claim 12, further comprising: using a telecommunication network to communicate with the electronic-communication device of the user.

15. The method of claim 12, wherein the electronic-communication device of the user is a voice-enabled wireless unit that is not a telephone.

16. The method of claim 12, wherein the corresponding descriptor file identifies the web-accessible information source and information used to generate proper requests to the information source with a specific URL format including search parameters.

17. The method of claim 12, wherein using the request information to fetch comprises fetching the response data from a database stored on a Local Area Network (LAN) or a Wide Area Network (WAN).

18. The method of claim 12, further comprising: using the named object to determine a beginning and an end of the content within the response data.

19. An apparatus with a capability of selectively retrieving information in response to spoken commands, the apparatus comprising:

(a) a transceiver coupled to a network and capable of sending to and receiving information via the network from an electronic-communication device of a user, which device has a microphone;

(b) a database containing a plurality of descriptor files, each of the descriptor files identifying (i) a web-accessible information source, and (ii) request information for fetching from the web-accessible source;

(c) a speech-recognition engine, coupled to the transceiver and having access to the database, programmed to automatically identify, one of a plurality of speech commands of a speech-recognition lexicon, based on audio data indicative of words spoken into the microphone of the electronic-communication device of a user;

(d) a media server, coupled to the speech-recognition engine and having access to the database, programmed to access a descriptor file from the plurality of descriptor files in the database based on the identified speech command expressing the request information;

(e) a web browsing server, coupled to the media server and programmed:

(i) to retrieve, from the web-accessible information source identified by the accessed descriptor file, responsive data specified by the request information identified by the accessed descriptor file, wherein the responsive data includes a named object including content; and (ii) to use a name of the named object to identify content relating to the name and to extract the content from the response data; and (f) a synthesizer coupled to the web browsing server and programmed to generate and transmit audio response data containing indicia of a message about the request information for the user, which message is responsive to the identified speech command, and which message is based on the extracted content;

(g) the apparatus is programmed to direct a command to play an audio response data using the electronic-communication device of the user.

20. The apparatus of claim 19, wherein the web browsing server is further programmed to use the accessed descriptor file to format a request for a content fetcher.

21. The apparatus of claim 20, wherein the content fetcher is executed in response to a command included in the accessed descriptor file that is executed on the web browsing server.

22. The apparatus of claim 19, wherein the speech-recognition engine is within the media server.

23. The apparatus of claim 19, wherein the web browsing server is further programmed to use the named object to determine a beginning and an end of the content within the responsive data.

24. An apparatus having a capability of selectively retrieving information in response to spoken commands, comprising:

(a) a microphone; and (b) a speaker coupled to the microphone; and (c) wherein the electronic-communication device is in communication with a remote computer system via a network to initiate user-defined searches; and (d) wherein the remote computer system comprises:

(i) a speech-recognition engine, coupled to a transceiver and having access to a database, programmed to identify, one of a plurality of speech commands of a speech-recognition lexicon, based on audio data indicative of words spoken into the microphone of the electronic-communication device of a user;

(ii) a media server, coupled to the speech-recognition engine and having access to a database containing a plurality of descriptor files, programmed to use the identified speech command to access a corresponding descriptor file from the plurality of descriptor files, wherein the corresponding descriptor file is used to identify (i) a web-accessible information source, and (ii) request information to fetch from the web-accessible information source;

(iii) a web browsing server programmed:

(A) to use the request information to fetch, from the web-accessible information source identified by the accessed descriptor file, response data including a named object including particular content; and (B) to use a name associated with the named object to identify content relating to the name and to extract the content from the response data;

(iv) a speech-synthesizer coupled to the web browsing server and programmed to generate and transmit audio response data containing indicia of a message for the user about the request information, which message is responsive to the identified speech command, and which message is based on the extracted content; and (v) wherein the remote computer system is programmed to direct a command to play the audio response data on the speaker.

25. The apparatus of claim 24, wherein the network is the Internet.

26. The apparatus of claim 24, wherein the network is a telecommunication network.

27. The apparatus of claim 24, wherein the electronic-communication device is a voice-enabled wireless unit that is not a telephone.

28. The apparatus of claim 24, wherein the web browsing server is further programmed to use the named object to determine a beginning and an end of the content within the responsive data.

* * * * *